(12) United States Patent
Marin et al.

(10) Patent No.: US 6,247,315 B1
(45) Date of Patent: Jun. 19, 2001

(54) OXIDANT CONTROL IN CO-GENERATION INSTALLATIONS

(75) Inventors: Ovidiu Marin, Lisle; Olivier Charon, Chicago, both of IL (US); Jean-Michel Samaniego, Asnieres sur Seine; Jacques Segret, Paris, both of (FR)

(73) Assignees: American Air Liquids, Inc., Walnut Creek, CA (US); L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/520,486

(22) Filed: Mar. 8, 2000

(51) Int. Cl.$^7$ .................................................. F01K 25/10
(52) U.S. Cl. ................................................ 60/672; 60/681
(58) Field of Search ............................ 60/670, 671, 672, 60/681

(56) References Cited

U.S. PATENT DOCUMENTS

| | | |
|---|---|---|
| 3,127,744 * | 4/1964 | Nettel .................... 60/672 X |
| 3,789,804 | 2/1974 | Aguet . |
| 3,984,196 | 10/1976 | Zenkner . |
| 4,085,708 | 4/1978 | Ashdown . |
| 4,106,286 | 8/1978 | Sakai et al. . |
| 4,116,005 | 9/1978 | Willyoung . |
| 4,204,401 | 5/1980 | Earnest . |
| 4,354,347 * | 10/1982 | Tomlinson et al. ........ 60/672 X |
| 4,414,813 | 11/1983 | Knapp . |
| 4,571,949 | 2/1986 | Moke . |
| 4,572,110 | 2/1986 | Haeflich . |
| 4,594,850 | 6/1986 | Joy . |
| 4,820,500 | 4/1989 | Obermiller . |
| 4,830,093 | 5/1989 | Price . |
| 4,936,088 | 6/1990 | Bell . |
| 5,022,226 | 6/1991 | Bell . |
| 5,033,414 | 7/1991 | Bruhn . |
| 5,101,772 | 4/1992 | Bruhn . |
| 5,159,562 | 10/1992 | Putman et al. . |
| 5,419,284 | 5/1995 | Kobayashi et al. . |
| 5,558,047 | 9/1996 | Vetterick . |

* cited by examiner

Primary Examiner—Hoang Nguyen
(74) Attorney, Agent, or Firm—Jeffrey L. Wendt (57) ABSTRACT

This invention is related to so-called combined cycle co-generation installations, and it addresses present concerns of the industry. Among these, combustion stability, corrosion (due to large water content in the flue gases), large heat transfer areas, and the like. In some embodiments, an additional heat exchanger is added to heat combustion air with a portion of the exhaust gases resulting from an engine, preferably a gas turbine. As a result, the efficiency of the cycle will improve, the oxidant will be enriched by above 50% oxygen, the combustion process will be enhanced, and the dimensions of the boiler may be reduced. It is considered that the combustion air will require between 10% and 80% of the total flue gas volume, more preferably between 20% and 40%. This is the portion of the flue gases sent through the heat exchanger. A control system designed to optimize the flow of the different streams is also presented. Other inventive embodiments forego heat exchanges in lieu of precise control of two flows of exhaust gas, with preferred addition of additional oxidant to the boiler burners.

23 Claims, 5 Drawing Sheets

OXIDANT CONTROL IN CO-GENERATION INSTALLATIONS

BACKGROUND OF THE INVENTION

1. Field of the Invention

This invention is directed generally to co-generation, and in particular to improvements therein.

2. Related Art

Efficient power generation represents one of the major challenges of the present generation. Huge power demands require a major effort from the industry, with great implications on world resources and the environment. Clean, efficient power generation methods are being sought by technical groups worldwide.

Co-generation has become one of the preferred choices for small and medium power generation units, due to its increased efficiency and adaptability. The combined gas turbine/steam generation cycle has evident advantages in terms of overall thermodynamic efficiency and also addresses industry power/heat requirements.

Extensive work emphasized in patents and publications has been generated on co-generation. Thus, Sakai et al. (U.S. Pat. No. 4,106,286) propose the concept in FIG. 3 of the present application, together with a de-nitration device placed before the boiler economizer. The boiler described in this patent is a heat recovery type, without additional combustion. In the same category can be placed the work of Haeflich (U.S. Pat. No. 4,572,110). This patent proposes a modification to the boiler, directed towards better emission control. Thus, following the superheater, a catalytic reduction system is implemented for NOx reduction.

Knapp (U.S. Pat. No. 4,414,813) presents a co-generation scheme in which gas turbine feed air is heated not through direct combustion, but via a heat exchanger. Thus, hot flue gases resulting from a bio-mass combustion process are passed through a heat exchanger which heats the compressed air used later in the gas turbine. This process has the advantage of using low quality fuel, but has the disadvantage of introducing a large heat exchanger before the gas turbine. This heat exchanger operates in conditions of high temperature on the side of the flue gases resulting directly from the combustion process, and high pressure on the compressed air side. The high cost of such a heat exchanger may be prohibitive for the implementation of such a scheme. Using a similar findamental approach, Willyoung (U.S. Pat. No. 4,116,005) presents a co-generation concept, where the gas turbine combustor is replaced by a heat exchanger located in the boiler. Thus, instead of having two combustion chambers (one between the gas turbine and the compressor, and the other in the boiler), the installation has only one chamber, in the boiler, where any fuel can be combusted. One of the drawbacks of this invention is the pressure loss in the compressed air heat exchanger, leading to efficiency losses.

Bell (U.S. Pat. No. 4,936,088) suggests a co-generation scheme consisting of a fuel-rich combustion scheme in the boiler, followed by a fuel-lean region to complete the combustion process. This scheme, although seemingly efficient in lowering NOx emissions, complicates the installation design. More recently, Bell (U.S. Pat. No. 5,022,226) extends the co-generation process to an internal combustion engine.

Joy (U.S. Pat. No. 4,594,850) presents a classical co-generation scheme as the one described in FIG. 3, using gaseous fuel.

Moke (U.S. Pat. No. 4,571,949) presents a co-generation scheme where the gas turbine exhaust gases are heated in a duct burner, and used to dry sludge. Following this process, the gases are reheated and sent to a traditional co-generation boiler. One aspect of the invention is the sludge heat exchanger, limited to this application, without the possibility to generalize.

Obermüller (U.S. Pat. No. 4,820,500) proposes a system to purify process gases through an afterburning technology. The gas flow rates are controlled such that the emissions are minimum, and gas concentration and maximum temperature are constant during the process.

Bruhn (U.S. Pat. No. 5,033,414) and U.S. Pat. No. 5,101,772) proposes an apparatus to burn low heating value fuels, and to use an intermediate heat transfer fluid to heat for instance water/steam in a modified boiler. A similar concept is disclosed by Price (U.S. Pat. No. 4,830,093).

Earnest (U.S. Pat. No. 4,204,401) presents a cogeneration cycle as described in FIG. 3 herein, with an additional recirculation of the flue gases exiting the boiler back into the air compressor. This recirculation is designed to improve the gas turbine operation at partial load.

Kobayashi et al. (U.S. Pat. No. 5,419,284) propose a co-generation unit modified boiler design. Thus, the duct burner using the gas turbine exhaust gases, together with an additional burner using additional fuel and air are combined in a single burner, thus reducing the burner/boiler dimensions.

Tomlinson and Cuscino (U.S. Pat. No. 4,354,347) discuss a cogeneration unit involving a heat recovery steam generator. The central concept is to control the flue gas temperature at the boiler outlet, such that it remains higher than the sulfur condensation temperature. Since this temperature is a function of the fuel, a manual or automated process control mechanism must be implemented.

Aguet (U.S. Pat. No. 3,789,804) proposes a scheme where at least two turbines are used to provide oxidizer/heat source for one single boiler. The exhaust from one gas turbine is directed into the boiler bumer, while the other turbine outlet is directed somewhere in the boiler. This design, although having some merit, makes the installation much more expensieve, due to the costs related to two gas turbine installations (compressor, combustor, turbine).

Ashdown (U.S. Pat. No. 4,085,708) presents a burner for a co-generation installation. The oil burner has a primary air duct surrounding the oil pipe, a secondary air section surrounding the primary air duct, and a gas turbine waste duct on the outer circumference of the secondary air. This scheme allows the possibility to use either the secondary air or the waste gases. The primary air is used for flame stability purposes.

Zenkner (U.S. Pat. No. 3,984,196) presents a burner concept for burning waste air. The invention is characterized by a strongly swirled motion, and by the presence of several concentric pipes, for fuel and a portion of the waste air, and for the bulk of the waste air. The fuel and the inner waste air stream create a primary flame which is swirled in one direction, while the outer waste air stream is swirled in the opposite direction.

Vetterich (U.S. Pat. No. 5,558,047) proposes a multi-nozzle bumer array for supplying fuel into the oxidizer. In order to maintain a low temperature process, heat exchangers are laced in the immediate vicinity of the burner, and lower the gas temperature.

Putman et al. (U.S. Pat. No. 5,159,562) propose a linear programming matrix used to represent a combustion process using multiple fuels. The SIMPLEX method is employed to optimize the fuel flows into the boiler.

Figure 1:
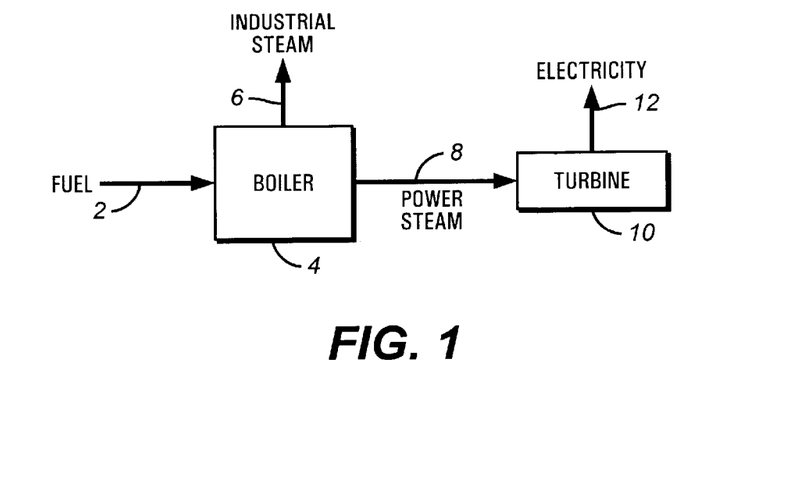
FIG. 1 is a schematic of a conventional boiler/steam turbine system.

The co-generation field thus includes different schemes, tailored for different needs and sizes. Some of the more common co-generation schemes can be summarized as follows:

I. Conventional boiler/steam turbine systems:

FIG. 1 presents the conventional steam/electricity co-generation installation, including a boiler generating steam. Fuel 2 enters a boiler 4 (usually with burners and combustion air), producing industrial steam 6 and power steam 8. Power steam 8 is directed to a steam turbine 10 to produce electricity 12. The steam is shared between the industrial needs (Industrial steam in FIG. 1), and the steam turbine generating electricity. The capacity of such a scheme is generally between 10 kW and 400 MW, and it has the advantage of burning a variety of fuels, since the flue gases from the boiler are exhausted in the atmosphere.

Figure 2:
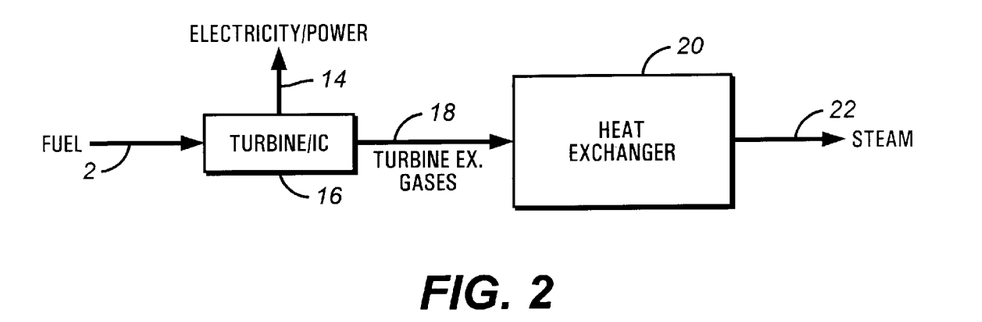
FIG. 2 is a schematic of a conventional combustion turbine system.

II. Conventional combustion turbine systems:

FIG. 2 presents the conventional combustion turbine systems, including a gas turbine providing electric power. Fuel 2 is combusted in turbine 16 to produce electricity 14 and turbine exhaust gases 18. The turbine exhaust gases are fed to a heat exchanger 20 and generate steam 22. The hot exhaust gases exiting the turbine are introduced in a steam generator, and the steam is generally used for industrial purposes. These units have a traditional capacity of 20 kW to 300 MW, and they are generally used in the chemical and petroleum refining industries. For small power requirements, the gas turbine can be replaced with an internal combustion engine. The flue gases are also used to generate steam in the heat exchanger.

Figure 3:
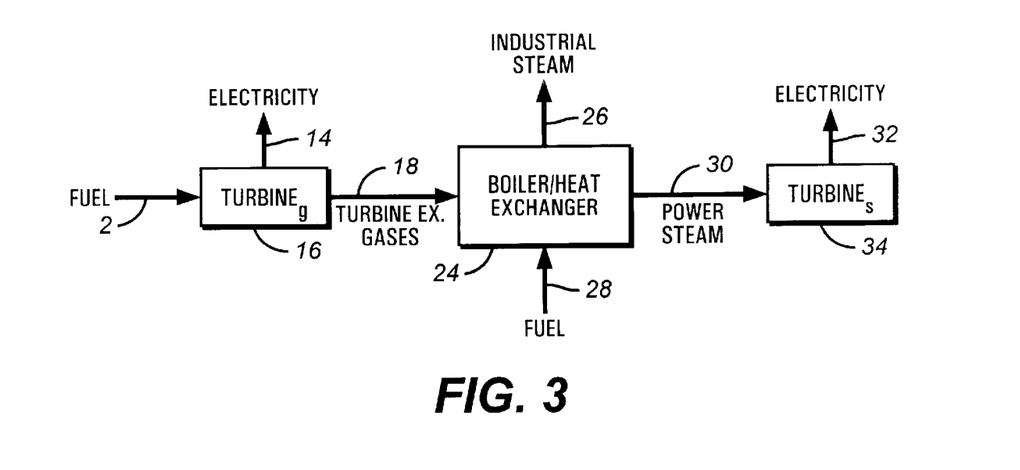
FIG. 3 is a schematic of a combined cycle combustion turbine system that is known in the art.

III. Combined cycle combustion turbine systems:

FIG. 3 presents the conventional combined cycle combustion turbine systems, including a gas turbine 16 generating electricity 14 (Turbine$_g$ in FIG. 1) and turbine exhaust gases 18. Gases 18 are directed towards a boiler 24, which can operate as a heat exchanger only as presented in FIG. 2, or as a regular boiler, where additional fuel 28 is fired. In this final configuration, the turbine exhaust gases act as a preheated oxidant in boiler 24. Boiler 24 generates steam 26 that can be used for industrial purposes, for electricity generation 30, 32, 34, or combined. The capacity of this scheme varies between 100 kW to several hundred MW. The combined cycle has a high power-to-heat ratio, and it is primarily used in the chemical and petroleum refining industries. This is the scheme making the object of this invention, and an improvement in the overall efficiency and in the cycle operation will be introduced.

Figure 4:
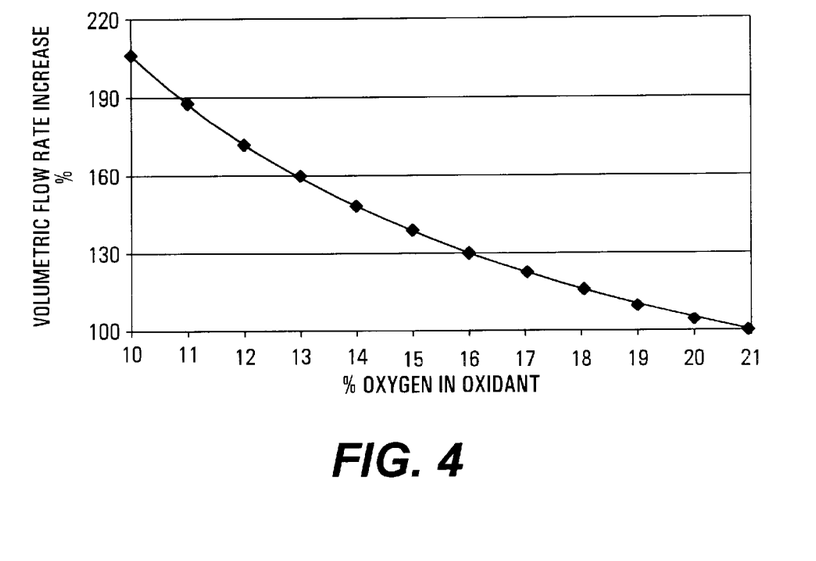
FIG. 4 is a schematic chart showing volumetric flow increase percentage as oxygen concentration in oxidant decreases.

Prior work has shown the interest to enhance the power-generation efficiency and improve its operation. This invention addresses both issues. Thus, it is noted that the flue gases exiting the turbine have low oxygen content, traditionally around 12–14%. This is the main reason why some of the prior art referenced above (U.S. Pat. No. 4,085,708), as well as existing technology, includes at least one jet of air, generally at ambient temperature. This cold air lowers the combustion temperature, and for low heating value fuels such as blast furnace gas or coke oven gas, it degrades the combustion process. By increasing the flue gas volume, the thermal losses and therefore the efficiency of the cycle is reduced. Also, the flue gas volume includes a large amount of "ballast" (nitrogen, water vapor, carbon dioxide) which requires large heat exchange areas, large ducts, etc. FIG. 4 presents the increase in the flue gas volume as the oxygen content decreases (for a fixed amount of oxygen transported through the system). For simplicity, the balance is considered to be nitrogen.

FIG. 4 shows that, as the oxygen concentration in oxidant is lowered to around 13% the volumetric flow rate through the boiler increases by around 60% when compared to the air case. This translates in larger dimensions for the boiler, or alternately higher velocities (meaning higher equipment erosion, higher energy required to transport the flue gases). At the same time, since the water vapor partial pressure in the flue gases is typically higher than in the air, the condensing temperature of the water vapor is higher, and the risk of corrosion increases. By introducing additional air into the boiler system for flame stability reasons, the gas flow rate increases even more. However, by introducing cold ambient air, the flame temperature decreases, and the combustion quality is negatively affected. This negative impact is more important when low quality fuel is used, such as blast furnace gas or coke oven gas. In this case the flame must be supported by a high quality fuel such as natural gas, increasing the fuel costs.

Thus, despite many attempts, there remains a need for improving efficiency and operation of combined cycle co-generation facilities.

SUMMARY OF THE INVENTION

The present invention brings a few solutions to improve the combustion/heat transfer processes in co-generation boilers, such as:

Use of an additional heat exchanger to heat furnace combustion air with a portion of the exhaust gases resulting from a combustion engine, such as gasoline, diesel, or natural gas engine, and preferably a gas turbine. As a result, the efficiency of the cycle will improve, the oxygen concentration of feed oxidant will be enriched by about 50% (from 12–14% oxygen to 21%), the combustion process will be enhanced, and the dimensions of the boiler will be reduced. It is considered that the preheated combustion air will require between 10% and 80% of the total gas turbine exhaust volume, more preferably between 20% and 40%. This is the portion of the gas turbine exhaust gases sent through the heat exchanger.

A control system designed to control the flow of the different streams for efficient heat transfer.

A simplified system to divide the combustion engine exhaust stream, preferably gas turbine exhaust stream, from the gas turbine into two streams, in order to improve the combustion system through the boiler. Thus, by controlling the combustion process, one gas turbine exhaust gas stream will be directed towards the boiler combustion chamber, while the balance will be directed towards the boiler convective heat exchangers. Any ratio between the volume of the two turbine exhaust gas streams is considered to be within the scope of this invention from 0 to 1, as a function of the fuel input.

Finally, an enhanced scheme where, besides dividing the engine exhaust gas flow into several streams, additional oxidant, preferably high concentration oxidant (above 21%, preferably about 85% oxygen concentration) is added to the process.

This invention brings improvements to the traditional combined cycle co-generation plant, leading to an improved process and increased overall efficiency. The implementation of this invention will increase the thermodynamic efficiency of the co-generation installation, and will enhance the boiler operation, by optimizing the combustion process.

Therefore, a first embodiment of the invention is an improved combustion process comprising providing an engine exhaust, preferably a turbine exhaust gas, derived from combustion of a first fuel, the exhaust gas divided into first and second exhaust gas streams; feeding the first exhaust gas stream into a boiler, and feeding the second exhaust gas stream into a heat exchanger; flowing air into the heat exchanger, and indirectly contacting the air with the second exhaust gas stream, thus forming a heated air stream; and combusting a second fuel with the heated air stream in the boiler to produce hot flue gases useful in producing steam in the boiler.

Particularly preferred are processes wherein the boiler has a convective heat exchanger, and a combustion chamber, and processes wherein the first exhaust gas stream enters the steam generating boiler upstream of the convective heat exchanger but downstream of the combustion chamber. Further preferred are processes wherein the combusting in step is carried out at a stoichiometry ranging from about 1.2 to about 1.3, and processes wherein one or more sensors are installed in the combustion chamber to measure one or more combustion parameters to provide combustion measurements. The combustion measurements are transmitted to a controller, the controller comparing the combustion measurements to set point values. The controller preferably controls the operation of control valves associated with the flow of the first and/or second exhaust gas streams, and/or the air flowing into the heat exchanger.

Further preferred processes in accordance with this aspect of this invention are those wherein one or more sensors having access to the combustion chamber measure one or more combustion parameters to provide combustion measurements, wherein the combustion measurements are transmitted to a controller, the controller comparing the combustion measurements to set point values and then controlling the operation of control valves associated with the flow of the first and/or second exhaust gas streams, and/or the air flowing to the heat exchanger.

A second embodiment of the invention is an improved combustion process comprising: providing an engine exhaust gas, preferably a turbine exhaust gas, derived from combustion of a first fuel, the exhaust gas divided into first and second exhaust gas streams; feeding the first exhaust gas stream into a boiler and feeding the second exhaust gas stream into a heat exchanger; flowing air into the heat exchanger, and indirectly contacting the air with the second exhaust gas stream, thus forming a heated air stream; combusting a second fuel with the heated air stream in a combustion chamber of the boiler to produce hot flue gases useful in generating steam in the boiler; measuring one or more combustion parameters in the combustion chamber to provide combustion measurements; exchanging heat between the hot flue gases and water in the boiler, producing a boiler flue gas stream; and mixing at least a portion of the boiler flue gas stream with the second exhaust gas stream prior to the second exhaust gas stream entering the heat exchanger.

A preferred embodiment is that wherein heat is exchanged between at least a portion of the boiler flue gas stream and the air to form a preheated air stream; and exchanging heat between the preheated air stream and the second exhaust gas stream, thereby producing a heated combustion air stream which is used in the boiler.

A third embodiment of the invention is an improved combustion process comprising: providing an engine exhaust gas, preferably a gas turbine exhaust gas, derived from combustion of a first fuel, the exhaust gas divided into first and second exhaust gas streams; feeding the first exhaust gas stream into a boiler and feeding the second exhaust gas stream into a burner, the burner also taking in a fuel which is combusted with residual oxygen in the second exhaust gas stream to produce hot flue gases useful in heating water in said boiler; adding additional oxidant to the second exhaust gas stream prior to entry to the burner, the additional oxidant comprising at least 21% oxygen; measuring one or more combustion parameters in the boiler to provide combustion measurements; and transmitting the combustion measurements to a controller which compares the combustion measurements to set point values and subsequently controls the operation of control valves associated with flow of the first and second exhaust gas streams. This embodiment eliminates the cost of a heat exchanger.

A fourth embodiment of the invention is an improved combustion process comprising: providing an engine exhaust gas, preferably a gas turbine exhaust gas, derived from combustion of a first fuel, the exhaust gas divided into first and second exhaust gas streams; feeding the first exhaust gas stream into a boiler and feeding the second exhaust gas stream into a burner, the burner also taking in a fuel which is combusted with residual oxygen in the second exhaust gas stream to produce hot flue gases useful in heating water in said boiler; adding an additional oxidant to the burner, the additional oxidant comprising at least 21 volume % oxygen, oxygen in the additional oxidant combusting with a portion of the fuel; measuring one or more combustion parameters in the boiler to provide combustion measurements; and transmitting the combustion measurements to a controller which compares the combustion measurements to set point values, and subsequently controls the operation of control valves associated with flow of the first and second exhaust gas streams, and the operation of a control valve associated with the flow of the additional oxidant.

In preferred embodiments of all processes of the invention, a portion of engine exhaust may be mixed with either cool air or heated air prior to the mixture being fed to the burner.

A preferred process in accordance with this embodiment is wherein the additional oxidant is supplied from an on-site oxidant source selected from the group consisting of PSA, TSA, VSA, membrane, and cryogenic units.

Also preferred are processes wherein the additional oxidant is supplied by vaporizing liquid oxidant.

Also preferred are processes where the engine exhaust is first fed to a unit which removes $NO_x$, such as a catalytic denox system, prior to entering the boiler or the burner.

Further advantages and features of the invention will be apparent upon review of the brief description of the drawings, the description of preferred embodiments, and the claims which follow.

DESCRIPTION OF PREFERRED EMBODIMENTS

Figure 5:
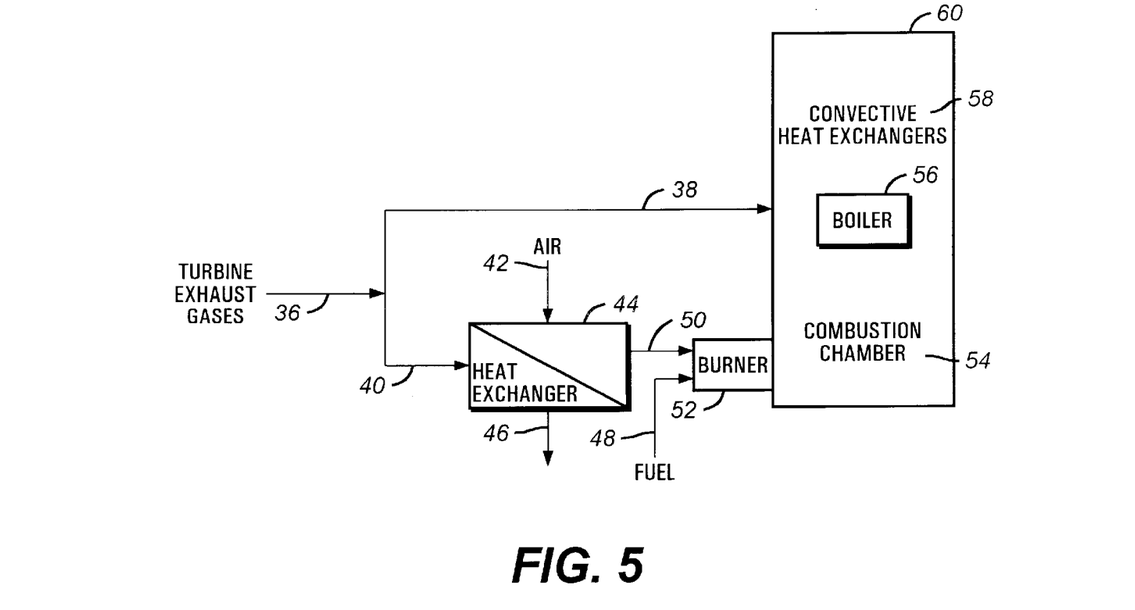
FIG. 5 is a schematic of a first embodiment in accordance with the present invention.

FIG. 5 presents the first embodiment of this invention. The exhaust gases 36 exiting the gas turbine are separated into two streams, a first and second stream 38 and 40. One stream 38 is directed to the boiler, as in prior art. One difference from the prior art is that this stream 38 of turbine exhaust gases is directed to the convective part of the boiler (56, 58). This way combustion chamber 54 will operate at higher temperatures, more efficient from a radiative heat transfer standpoint. The second stream of the turbine exhaust gas 40 is sent to a heat exchanger 44 where the turbine exhaust gases 40 heat a stream of ambient air 42. Cooled turbine exhaust gases 46 can be released in the atmosphere, and the preheated air 50 represents the new, improved oxidant. If the original turbine exhaust gases contain 13% oxygen, it can be considered that this process enriches the oxidant about 60%, with a significant impact on boiler combustion.

Ambient air 42 into the heat exchanger can theoretically be heated up to a temperature equal to the temperature of turbine exhaust gas 36. In practice, the temperature of preheated air 50 will be determined from economic considerations, such that the overall cost of the installation and the operational costs are minimized. It will be understood that the second stream 40 of the turbine exhaust used to heat air 42 may flow through one or more heat exchangers, which may be arranged in parallel or series configuration. The actual flow pattern of second stream 40 in relation to air 42 may be cocurrent, countercurrent, cross flow, or any other configuration known in the heat transfer art.

Preheated air 50 is directed to a burner 52 along with a fuel 48. Burner 52 provides radiant heat via a combustion chamber 54. Boiler tube section 56 and convective heat exchanges 58 complete the boiler 60.

The design in FIG. 5 allows combustion chamber 54 to be smaller than those in conventional co-generation boilers due to the following reasons:

The oxygen concentration in preheated air 50 is larger, therefore for the same amount of oxygen the volumetric flow rate of oxidant is lower, as described in FIG. 4.

The turbine exhaust gas 36 exiting from the gas turbine is split into two different streams 38 and 40, thus further lowering the volume sent into boiler combustion chamber 54.

The combustion zone is characterized by higher temperatures, due to a combustion process which is closer to stoichiometry (1.2–1.3, as opposed to 1.7–2.0 as in prior art), and also to higher oxygen concentration in the oxidant.

This fact increases the radiative heat transfer to the boiler tubes, and lowers the boiler volume.

The design in FIG. 5 can also be used to stage the combustion process, and thus to reduce NOx emissions.

The embodiment illustrated in FIG. 5 can lead to a reduction in turbine exhaust gases, which are ordinarily fed into the combustion space by 40–80%, depending on the operational conditions.

The embodiment presented in FIG. 5 is particularly applicable for co-generation installations using low-quality fuels originating from other industrial processes. Such processes produce variable rates of fuel, and thus the oxidant requirements are variable as well. Different fuels require not only different amounts of oxygen, but also different excess oxidant amounts for optimal combustion, therefore controlling the oxidant flow rate may improve the overall process, in terms of emissions, unburnt fuel, heat transfer, and the like. In this circumstance, the ability to control the flow of oxidant and amount of oxygen in the oxidant into the combustion chamber are desired for securing an efficient combustion process.

A preferred embodiment of the present invention proposes a control method for providing the optimal amount of oxidant, in strict correlation to the amount and the quality of the fuel.

Figure 6:
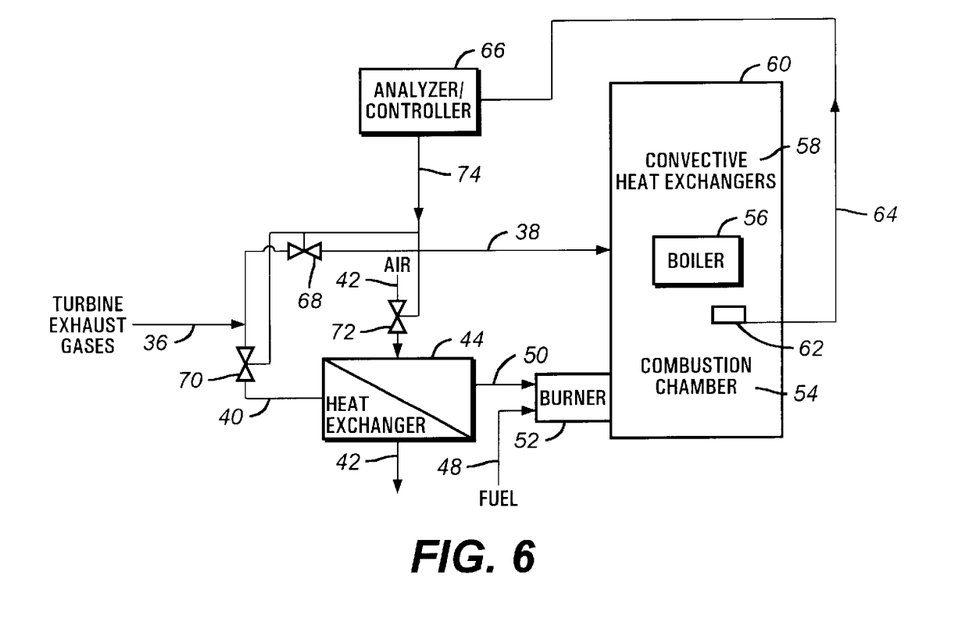
FIG. 6 is a schematic showing a control scheme for the embodiment illustrated in FIG. 5.

FIG. 6 represents schematically a method to control the process of the first embodiment of this invention. Thus, one or more sensor(s) 62 installed in (or having access to) the combustion chamber 54 measure(s) one or several parameters, such as the oxygen content in the flue gases, the temperature of the flue gases, and the like. This information is transmitted via hard wire 64 or remote transmission to a controller 66, which can be a PLC, or similar device. Controller 66 compares sensed values of the parameters with setpoint values, and will then control (via signals 74) the turbine exhaust gas flow through the two different streams 38 and 40, and the air flow 42 into the heat exchanger, via valves 68, 70, and 72, respectively.

The control method depicted in FIG. 6 has multiple advantages:

Enhances the combustion process, by controlling key parameters such as oxygen concentration and temperature of combustion flue gas emanating from the boiler.

Controls the heat exchanger 44 operation, by controlling the flows of air/turbine exhaust gases, thus maintaining the desired parameters such as temperature and flow rate of combustion air 50 into boiler 60.

Figure 7:
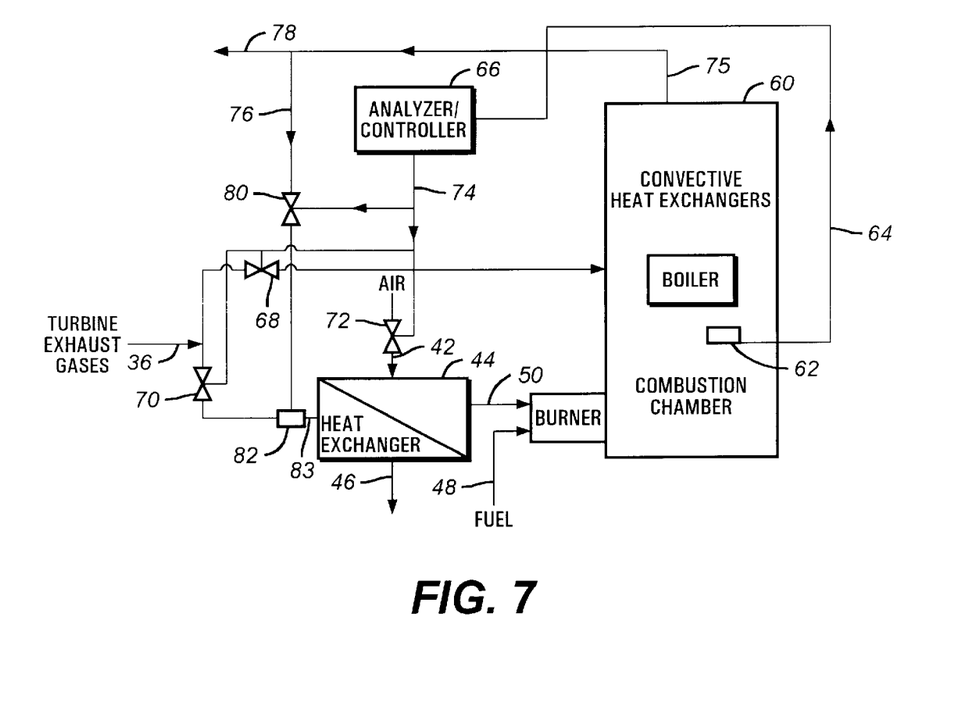
FIG. 7 is a schematic of a second embodiment in accordance with the present invention wherein a portion of boiler flue gas is used to combine with turbine exhaust gases prior to preheating the combustion air.

An alternate embodiment is derived directly from the designs depicted in FIGS. 5 and 6. The embodiment illustrated in FIG. 7 proposes an enhanced efficiency design, where the air heat exchanger 44 is built such that:

Additional heat is recovered from flue gases 75 exiting boiler 60; and

The combustion exhaust stream 38 from the gas turbine entering the combustion zone of boiler 60 can be minimized (for the same combustion air final temperature), such that convective zone (56, 58) of boiler 60 receives an increased heat flux.

The design in FIG. 7 (second embodiment) provides that a portion 76 of the flue gases 75 exiting boiler 60 (generally with a temperature of above 500 K) is introduced in (mixed with) the second turbine exhaust gas stream 40 coming from the gas turbine, and this mixed stream 83 is the hot agent used to heat the combustion air.

Figure 7A:
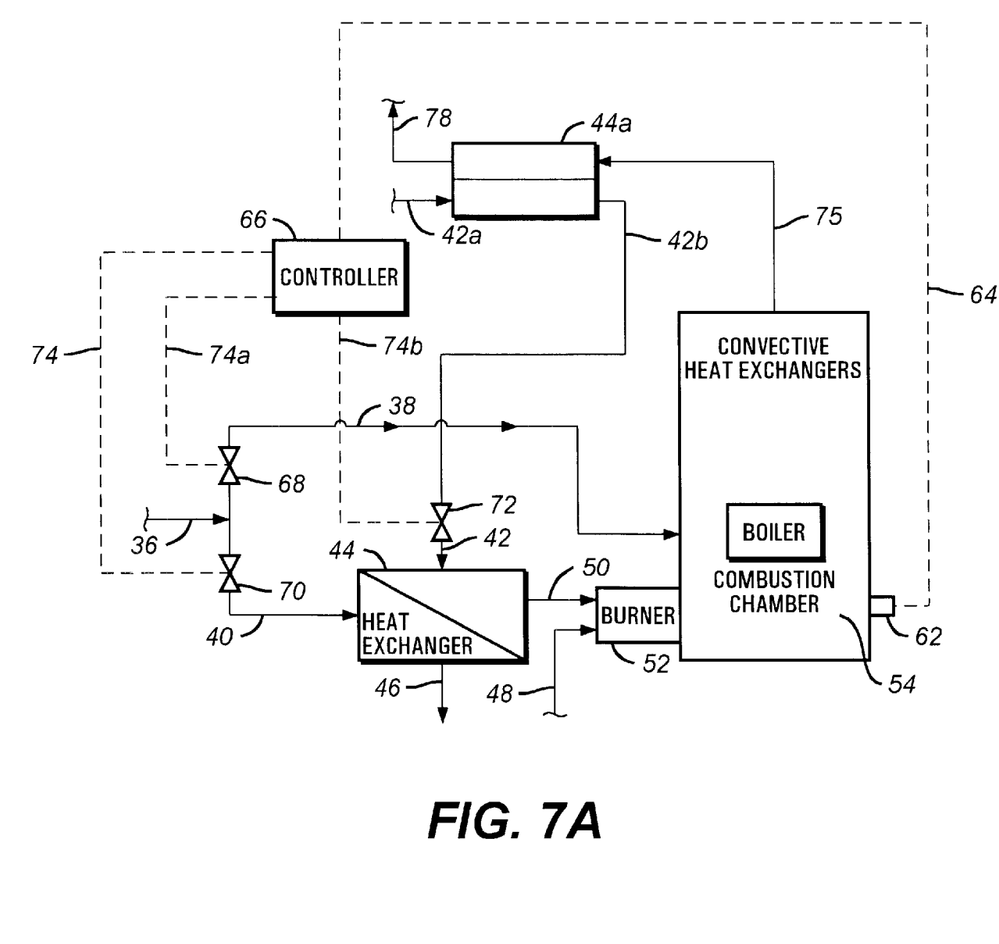
FIG. 7a is a schematic process flow diagram of an alternative embodiment in accordance with FIG. 7, wherein furnace flue gas is first used to preheat combustion air and then turbine exhaust gas is used to further heat the combustion air.

It is noted that the heat exchanger 44 heating air 42 can be designed in a multitude of forms, depending on the particular operational parameters of the installation. For example, the combustion air 42 can be heated in several stages, first by the flue gases 75 coming out of boiler 60, and then by the turbine exhaust gases 40. This scheme is depicted in FIG. 7a, where boiler flue gas 75 enters a heat exchanger 44a and indirectly contacts ambient air 42a, thus creating a waste stream 78 and a first preheated air stream 42b. Stream 42b is then routed via valve 72 to heat exchanger 44, where the first preheated air stream 42b contacts the second turbine exhaust stream 40, as in previous embodiments, thus forming a second preheated air stream.

While considered to be very effective, the embodiments of the invention presented so far require at least one additional heat exchanger, with additional cost. A simplified installation deriving directly from the first embodiment presented in FIG. 6 is described with reference to FIG. 8. This design, although less efficient than the first embodiment, has certain advantages described below.

Co-generation equipment is a complicated installation, including basically two different thermodynamic cycles, namely the gas turbine (Brayton) cycle and the steam turbine (Rankine) cycle. For maximum efficiency the two cycles have to be very well coordinated. Thus, the exhaust gases resulting from the Brayton cycle, which constitute the oxidant for the Rankine cycle, have to be well correlated to the fuel introduced in the boiler. In many instances this correlation cannot be ensured at all boiler loads, particularly when the fuel rate and/or heating value of the fuel is not constant, as described above. In these circumstances, the excess oxidant can be highly variable, with values reaching 170% to 200% of the stoichiometric values. This fact lowers the temperature in the combustion chamber, particularly for low heating value fuels it may negatively affect the combustion process. Operation far from stoichiometry in these circumstances can lead to adverse effects as flame instability, vibrations, and the like.

Figure 8:
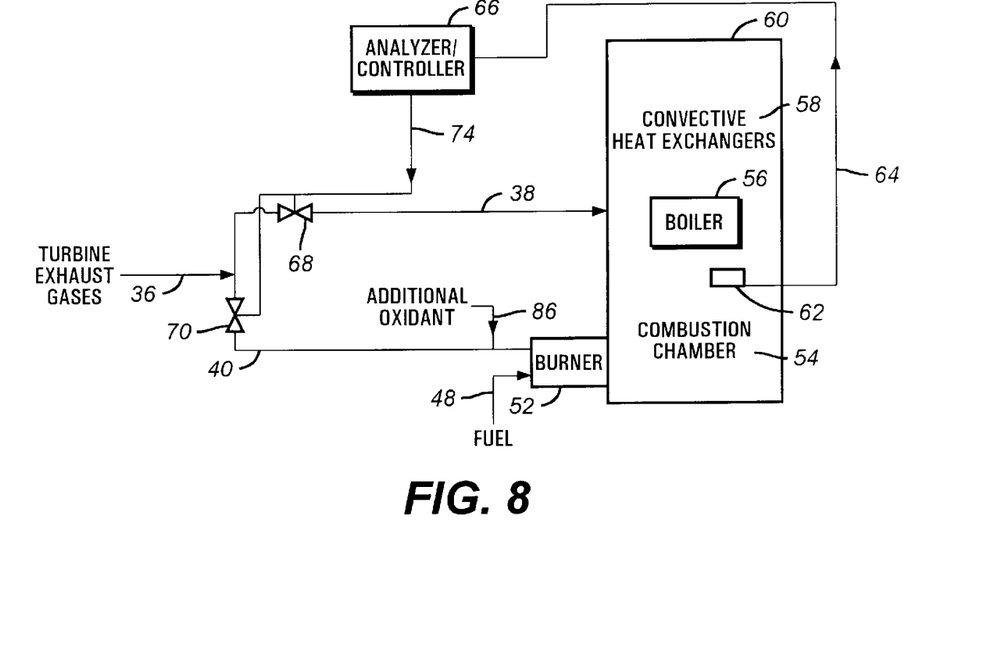
FIG. 8 is a schematic of another embodiment in accordance with the present invention, which eliminates the use of a combustion air heat exchanger.

These problems are addressed by the third embodiment depicted schematically in FIG. 8. The exhaust gas stream 36 exiting from a gas turbine is split into two different streams, one 40 directed towards the burner, and one 38 directed towards a downstream location from combustion chamber 54 in boiler 60. In addition, an additional oxidant 86 is mixed with stream 40 prior to the burner. The volumetric flow rate through the two different exhaust streams and preferably the stream 86, is controlled by a sensor/analyzer/controller 62, 64, 66, 74 method similar to the one discussed in relation to FIG. 6. It is noted that the third embodiment in FIG. 8 does not have all the advantages of the first embodiment (the lower flow rate through the boiler, the higher oxygen content). On the other hand, the third embodiment has the advantage of being simpler to implement, by removing the additional turbine exhaust gas/air heat exchanger.

Figure 9:
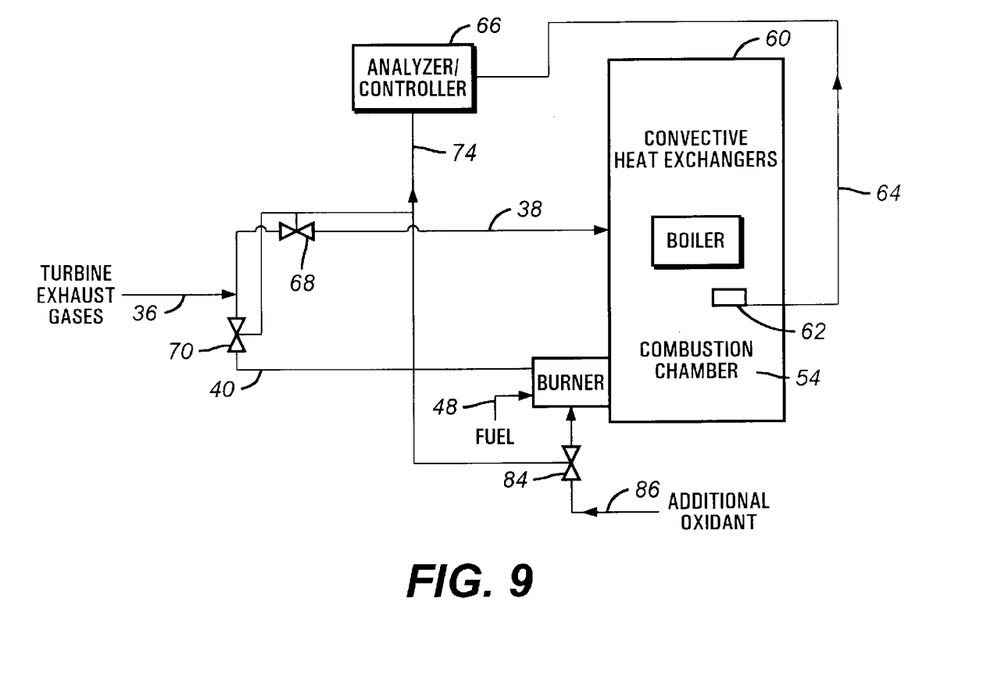
FIG. 9 is a process schematic of another embodiment in accordance with the invention wherein additional oxidant is used to burn fuel and turbine exhaust gases and create heat for the combustion chamber of a boiler.

The limitations of the third embodiment can be addressed by using an additional oxidant at the boiler, other than turbine exhaust gases. Thus, an oxidant stream containing at least 21% oxygen can supplement the oxygen requirement in the boiler. FIG. 9 illustrates schematically this fourth embodiment, where valve 84, controlled preferably by controller 66, admits oxidant 86.

It is noted that the fourth embodiment in FIG. 9 envisions preferably the use of oxidants with high concentrations of oxygen, such as provided from a liquid oxygen source, or from an on-site generation unit (with oxygen concentrations of 85% and above), for example membrane, TSA, PSA or VSA, or cryogenic air separation unit. The addition of oxygen is intended to improve the combustion process, particularly in the presence of low calorific value fuels, such as waste fuels. The implementation of oxygen enrichment in the boiler has been extensively investigated in a previous patent application Ser. No. 09/329,555, filed Jun. 10, 1999, incorporated by reference herein, and all the advantages/techniques of that patent can be applied in the co-generation boiler units. In this circumstance, the sensor(s) 62 in combustion chamber 54 may monitor, besides the oxygen content, the unburnt fuel, carbon monoxide, flame temperature, and the like. The control scheme is more involved in this case due to the presence of two independent oxidant streams 40 and 86, and this is why other parameters such as the ones described above are preferably additionally monitored.

Burners suitable for use in the present invention may be either pre-mix or post-mix burners, as are well known to the skilled combustion artisan. Furthermore, the fuel entering the burner may be preheated via a portion of the turbine exhaust gases, boiler flue gases, or both.

Heat exchangers useful in the invention may be shell and tube construction, spiral, and any other construction known in the art. One well designed heat exchanger for combustion purposes is that described in applicant's co-pending patent application Ser. No. 09/220,559, filed Dec. 23, 1998, incorporated by reference herein.

Various other embodiments and features may be envisioned by those of skill in the combustion and co-generation arts, and these are intended to be within the scope of the following claims.

What is claimed is:

1. An improved combustion process comprising:
   a. providing an engine exhaust derived from combustion of a first fuel, the exhaust gas divided into first and second exhaust gas beams;
   b. feeding the first exhaust gas stream into a boiler, and feeding the second exhaust gas stream into a heat exchanger;
   c. flowing air into the heat exchanger, and indirectly contacting the air with the second exhaust gas stream, thus forming a heated air stream; and
   d. combusting a second fuel with the heated air stream to produce hot flue gases useful in heating water in said boiler.

2. Process in accordance with claim 1 wherein the boiler has a convective section and a combustion chamber.

3. Process in accordance with claim 2, wherein the first exhaust gas stream enters the boiler upstream of the convective section but downstream of the combustion chamber.

4. Process in accordance with claim 1 wherein the combusting in step (d) is carried out at a stoichiometry ranging from about 1.2 to about 1.3.

5. Process in accordance with claim 2 wherein one or more sensors installed in the combustion chamber measure one or more combustion parameters to provide combustion measurements.

6. Process in accordance with claim 5 wherein the combustion measurements are transmitted to a controller, the controller comparing the combustion measurements to set point values and then controlling the operation of control valves associated with flow of the first exhaust gas stream into said boiler.

7. Process in accordance with claim 2 wherein one or more sensors having access to the combustion chamber measure one or more combustion parameters to provide combustion measurements.

8. Process in accordance with claim 7 wherein the combustion measurements are transmitted to a controller, the controller comparing the combustion measurements to set point values and then controlling the operation of control valves associated with the flow of the first exhaust gas stream into said boiler.

9. An improved combustion process comprising:
a. providing an engine exhaust derived from combustion of a first fuel, the exhaust gas divided into first and second exhaust gas streams;
b. feeding the first exhaust gas stream into a boiler having a combustion chamber and feeding the second exhaust gas stream into a heat exchanger;
c. flowing air into the heat exchanger, and indirectly contacting the air with the second exhaust gas stream, thus forming a heated air stream;
d. combusting a second fuel with the heated air stream in the combustion chamber to produce hot flue gases useful in heating water in said boiler;
e. measuring one or more combustion parameters in the combustion chamber to provide combustion measurements;
f. exchanging heat between the hot flue gases and water in the boiler, producing a boiler flue gas stream; and
g. mixing at least a portion of the boiler flue gas stream with the second exhaust gas stream prior to the second exhaust gas stream entering the heat exchanger.

10. An improved combustion process comprising:
a. providing an engine exhaust derived from combustion of a first fuel, the exhaust gas divided into first and second exhaust gas streams;
b. feeding the first exhaust gas stream into a boiler having a combustion chamber;
c. flowing air into a first heat exchanger, and indirectly contacting the air with at least a portion of boiler flue gas stream, thus forming a preheated air stream;
d. exchanging heat between the preheated air stream and the second exhaust gas stream, thereby producing a heated combustion air stream;
e. combusting a second fuel with the preheated air stream in the combustion chamber to produce hot flue gases useful in heating water in said boiler;
f. measuring one or more combustion parameters in the combustion chamber to provide combustion measurements;
g. transmitting the combustion measurements to a controller which compares the combustion measurements to set point values and subsequently controls the operation of control valves associated with flow of the first and second exhaust gas streams; and
h. exchanging heat between the hot flue gases and water in the boiler, thereby producing a boiler flue gas stream.

11. An improved combustion process comprising:
a. providing an engine exhaust derived from combustion of a first fuel, the exhaust gas divided into first and second exhaust gas streams;
b. feeding the first exhaust gas stream into a boiler and feeding the second exhaust gas stream into a burner, the burner also taking in a fuel which is combusted with residual oxygen in the second exhaust gas stream to produce hot flue gases useful in heating water in said boiler;
c. adding additional oxidant to the second exhaust gas stream prior to try to the burner, the additional oxidant comprising at least 21% oxygen;
d. measuring one or more combustion parameters in the boiler to provide combustion measurements; and
e. transmitting the combustion measurements to a controller which compares the combustion measurements to set point values and subsequently controls the operation of control valves associated with flow of the first and second exhaust gas streams.

12. An improved combustion process comprising:
a. providing an engine exhaust derived from combustion of a first fuel, the exhaust gas divided into first and second exhaust gas streams;
b. feeding the first exhaust gas stream into a boiler and feeding the second exhaust gas stream into a burner, the burner also taking in a fuel which is combusted with residual oxygen in the second exhaust gas stream to produce hot flue gases useful in heating water in said boiler;
c. adding an additional oxidant to the burner, the additional oxidant comprising at least 21 volume % oxygen, oxygen in the additional oxidant combusting with a portion of the fuel;
d. measuring one or more combustion parameters in the furnace to provide combustion measurements; and
e. transmitting the combustion measurements to a controller which compares the combustion measurements to set point values, and subsequently controls the operation of control valves associated with flow of the first and second exhaust gas streams, and the operation of a control valve associated with the flow of the additional oxidant.

13. The process in accordance with claim 12 wherein the additional oxidant is supplied from an on-site oxidant source selected from the group consisting of PSA, VSA, TSA, membrane, and cryogenic units.

14. The process in accordance with claim 12 wherein the additional oxidant is supplied by vaporizing liquid oxidant.

15. The process in accordance with claim 1 wherein said engine exhaust gas is turbine exhaust gas.

16. The process in accordance with claim 9 wherein said engine exhaust gas is turbine exhaust gas.

17. The process in accordance with claim 10 wherein said engine exhaust gas is turbine exhaust gas.

18. The process in accordance with claim 11 wherein said engine exhaust gas is turbine exhaust gas.

19. The process in accordance with claim 12 wherein said engine exhaust gas is turbine exhaust gas.

20. The process in accordance with claim 5 wherein the combustion measurements are transmitted to a controller, the controller comparing the combustion measurements to set point values and then controlling the operation of control associated with flow of the second exhaust gas stream into said boiler.

21. The process in accordance with claim 5 wherein the combustion measurements are transmitted to a controller, the controller comparing the combustion measurements to set point values and then controlling the operation of control valves associated with flow of the air flowing into the heat exchanger.

22. The process in accordance with claim 7 wherein the combustion measurements are transmitted to a controller, the controller comparing the combustion measurements to set point values and then controlling the operation of control associated with flow of the second exhaust gas stream into said boiler.

23. The process in accordance with claim 7 wherein the combustion measurements are transmitted to a controller, the controller comparing the combustion measurements to set point values and then controlling the operation of control valves associated with flow of the air flowing into the heat exchanger.

* * * * *

UNITED STATES PATENT AND TRADEMARK OFFICE
CERTIFICATE OF CORRECTION

PATENT NO. : 6,247,315 B1
DATED : June 19, 2001
INVENTOR(S) : Ovidiu Marin et al.

It is certified that error appears in the above-identified patent and that said Letters Patent is hereby corrected as shown below:

Column 10,
Line 31, please replace the word "beams" with the word -- streams --.

Column 11,
Line 61, please replace the word "try" with the word -- entry --.

Signed and Sealed this

Second Day of September, 2003

JAMES E. ROGAN
*Director of the United States Patent and Trademark Office*